United States Patent [19]

Quitmann et al.

[11] Patent Number: 4,572,395
[45] Date of Patent: Feb. 25, 1986

[54] SCREW CAP HAVING VENT MEANS

[75] Inventors: Horst Quitmann; Dieter Bangert, both of Frankfurt am Main, Fed. Rep. of Germany

[73] Assignee: Alfred Teves GmbH, Frankfurt am Main, Fed. Rep. of Germany

[21] Appl. No.: 710,915

[22] Filed: Mar. 12, 1985

[30] Foreign Application Priority Data

Mar. 31, 1984 [DE] Fed. Rep. of Germany ....... 3412059

[51] Int. Cl.[4] .............................................. B65D 51/16
[52] U.S. Cl. .................................................... 220/203
[58] Field of Search ................ 220/202, 203, 209, 367

[56] References Cited

U.S. PATENT DOCUMENTS 3,423,939 1/1969 Lewis et al. ......................... 220/203
3,948,414 4/1976 Hagerty ............................... 220/203

Primary Examiner—George T. Hall
Attorney, Agent, or Firm—James B. Raden

[57] ABSTRACT

A screw cap for a brake fluid reservoir is provided including an opening with a pressure-balancing device sealingly surrounding the opening. The pressure-balancing device is comprised of a protective cover and a port configured in the protective cover. In order to prevent the penetration of splash water through the port into the space filled with brake fluid, the protecting cover is surrounded by a guard with a passage, and the passage is always arranged below the port.

9 Claims, 2 Drawing Figures

SCREW CAP HAVING VENT MEANS

BACKGROUND OF THE INVENTION

The invention is related to a screw cap, in particular for fluid reservoirs of hydraulic actuating systems. The cap has an opening with a pressure-balancing device sealingly surrounding the opening. The pressure-balancing device is comprised of a protecting cover and a port in the protecting cover.

Known types of such screw caps are usually utilized in fluid reservoirs of hydraulic brake systems in automotive vehicles. One disadvantage of such caps occurs during a motor wash when cleansing liquid is splashed against the vehicle motor at high pressure. The cleansing liquid can penetrate into the interior space of the fluid reservoir through the pressure-balancing device.

Since the brake fluid is hygroscopic which means that it is capable of absorbing water, the boiling point of the brake fluid is undesirably reduced. The result thereof is that if that water reaches the wheel cylinder space of a brake, vapor locks come about at an early moment in the wheel cylinder space under the effect of elevated temperatures, so that considerable lost travel is caused at the brake pedal. The result may even be a total failure of a brake system.

Sealing of the pressure-balancing device to obtain absolute tightness is not possible because in that case an overpressure or a vacuum would be generated in the fluid reservoir on account of the volume of brake fluid required to be delivered to the wheel brakes. The consequence is that a smooth flow of the brake fluid would no longer be guaranteed.

The present invention has an object to provide an improved screw cap through which, under normal conditions or in the presence of extreme external influences, no liquid penetrates into a tank or reservoir.

SUMMARY OF THE INVENTION

According to the present invention, an improved screw cap is provided with a protective cover surrounded by a guard furnished with a passage. The passage is always arranged below a port in the reservoir. Owing to this inventional measure, although undesired liquid may invade the space formed between the guard and the protecting cover making its way through the guard, the penetration of liquid into the interior space of the tank or reservoir through the port is rendered impossible due to the different levels at which the guard and the port are arranged. Indeed, as soon as the level of the undesired liquid arrives at the upper end of the outlet of the passage a further rise of the liquid within the space formed by the guard and the protecting cover will no longer be possible since the liquid will then be pressed from the inside to the outside.

In a protecting cover which is configured with a cup-shaped cross-section, the port is arranged at the upper rim of the protecting cover. The base is formed by a ring-shaped rim which is sealingly received in a circular groove of the screw cap and is bounded in radial direction by an annular collar configured at the screw cap. A guard features a substantially cup-shaped cross-section with a ring-shaped rim portion which rests on the rim of the protecting cover and which is bounded and retained by the rim in radial as well as in axial direction. By this arrangement, the protecting cover is sealed and fastened at the screw cap in a particularly reliable manner.

According to the present invention, an especially reliable manufacture of the passages is attained when the bottom area located opposite the rim is penetrated by slots extending radially from the inside toward the outside. It is also desirable to provide the annular collar with an opening at the level of the slots which penetrates the annular collar in radial direction. In order that a connection is always established from the passage to the opening irrespective of the mounting position of the guard, passages are provided which are uniformly distributed over the circumference of the bottom area. In this configuration, the distance from one passage to the next must not be larger than the width of a ring segment forming the passage.

Another desirable feature is to have a radially inwardly projecting ring-shaped collar clamp the ring-shaped rim portion from behind in the mounting position. By this arrangement, a particularly safe fixation of the guard and of the protecting cover at the screw cap is realized. During installation, the guard is radially inwardly deformed by the annular collar until the rim portion catches behind the collar. Such a clipping-in procedure affords an especially easy mounting. The guard is made of a high-strength plastic and the protecting cover made of a particularly elastic rubber material in order that the fixation ensures a particularly long-term and safe sealing in any condition.

An especially good valve function of the port is attained when the port is formed by a tongue configured in one piece with the protecting cover. The tongue shuts off the port in an initial position and opens the port in the presence of overpressure or vacuum in the direction of the pressure gradient of the specific condition. The deformability of the tongue is obtained in an advantageous manner when the material of the protecting cover is constituted by a particularly flexible material having a low Shore hardness.

In order not to let the guard excessively project at the screw cap and to simultaneously insure that the port is not obstructed by the guard, it is envisaged according to the invention to configure a holding-down member in the upper range at the inside wall of the guard. Such holding-down member is directed toward the upper rim of the protecting cover. To cause the protecting cover to be pressed down uniformly while safeguarding nevertheless a connection from the port to the passage, the holding-down member is formed by an annular collar which is penetrated by a slot in radial direction.

In an especially advantageous embodiment of the present invention, an electric fluid level warning device is fastened in the screw cap beneath the protecting cover. Accordingly, both the electric contacts of a fluid level warning device and the brake fluid are protected from the atmosphere. This is, indeed, indispensible for a trouble-free longtime functioning of the brake system.

DESCRIPTION OF THE PREFERRED EMBODIMENT

Figure 1:
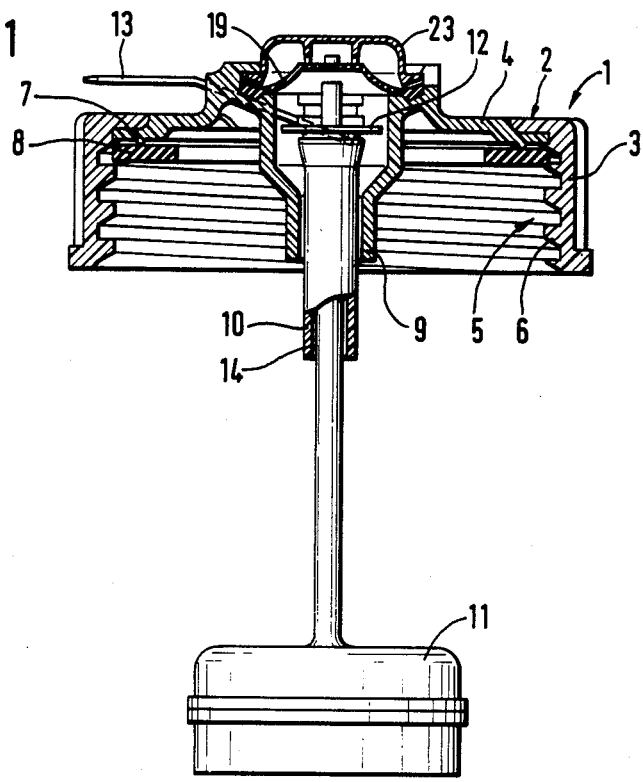
FIG. 1 is a longitudinal partial cross-section through a screw cap in accordance with the present invention having an electric fluid level warning device.
Figure 2:
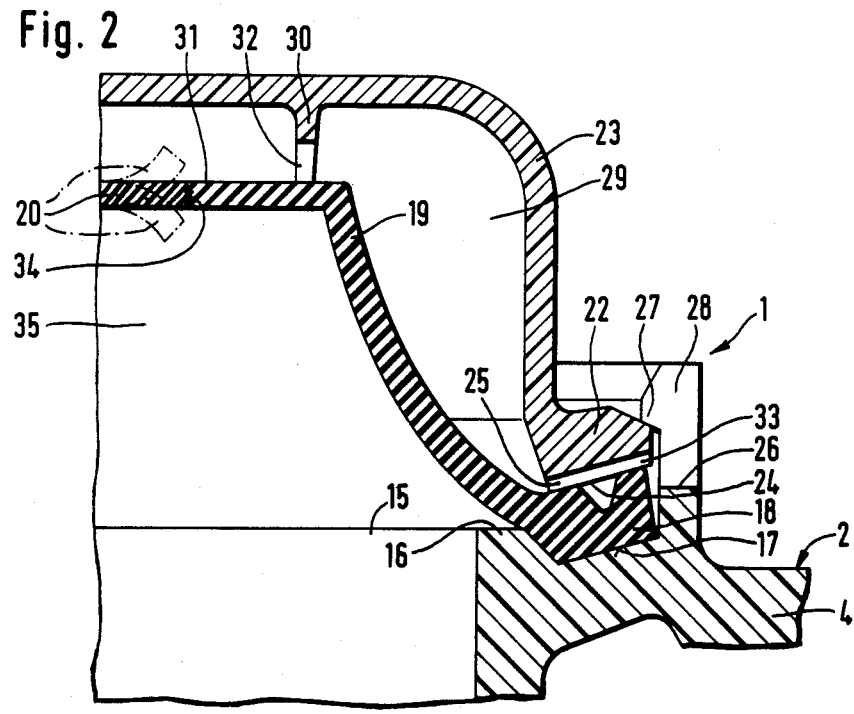
FIG. 2 is a detailed longitudinal partial cross-section on the right side of the center line of a screw cap in accordance with the area of the guard.

The screw cover 1 illustrated in FIGS. 1 and 2 of the drawing is substantially comprised of a screw cap 2 made up of lower and upper portions 3 and 4. At the inside wall 5 of the lower portion 3, there is provided a thread 6 which serves to screw the screw cover 1 to a filler neck of a fluid reservoir not shown in the drawing. At inside wall 5 of upper portion 4, there is configured a ring-shaped torus 7 against which a sealing ring 8 is abutted. The external diameter of sealing ring 8 is larger than the internal diameter of thread 6, thereby prohibiting sealing ring 8 from getting lost in the unmounted condition of the screw cover 1.

In the center of screw cover 1, upper portion 4 is formed with a downwardly extending funnel-shaped cylinder 9 within which a guide tube 10 is guided which bears a float 11 in its lower portion and a contact disc 12 in its upper portion. Contact lugs are configured on either side of contact disc 12, with only contact lug 13 visible in the drawing. The contact lugs extend oliquely upwardly through upper portion 4 and subsequently, from their exit from upper portion 4 onwards, in a horizontal and radially outward direction. In the position of screw cover 1 as illustrated in FIG. 1, contact disc 12 is in contact with contact lug 13 and with the contact lug positioned behind it in the same plane. Float 11 is welded to guide tube 10 in a form-locking configuration. In this manner, a triggering of the electric contact arrangement during operation is possible exclusively at a defined fluid level.

Opening 15 configured at the top side of upper portion 4 according to FIG. 2 constitutes the end of guide tube 10. At its upper end, opening 15 is formed with a ring-shaped step 16 at the radially external rim of which there is provided a substantially V-shaped circular groove 17. As will be described in more detail further onwards, rim 18 of protecting cover 19, which latter presents an omega or cup-shaped cross-section, is sealingly fastened in circular groove 17.

At the upper end of protecting cover 19, there exists a port 34 with a tongue 20 which is manufactured by punching out one piece of protecting cover 19. The illustrations of tongue 20 in dashed lines indicated the positions tongue 20 may assume in operation due to the differences in pressure.

At its radially external edge, circular groove 17 ends with an upwardly extending annular collar 26. Above rim 18, there is arranged ring-shaped rim portion 22 of guard 23 having a substantially cup-shaped configuration. Radially outwardly extending passages 25 are uniformly distributed over the circumference at the bottom area 24 of rim 22. With their radially external edge, passages 25 are adjacent to annular collar 26 which extends beyond rim 18 in an upward direction as shown in the drawing. At its inside wall, annular collar 26 is furnished with a collar 27 which serves to fasten guard 23 and protecting cover 19 to upper portion 4. For this purpose, guard 23 is slid over collar 27 and engages in annular collar 26 shortly behind collar 27. In this context, the height of rim 18 is sized such that rim 18 is pressed against circular groove 17 in a pressure-tight manner.

Annular collar 26 is provided with at least one opening 28 at the level of passages 25 which established a connection from the passages 25 and from the chamber formed by guard 23 and protecting cover 19 to tongue 20.

If the tolerances of guard 23 and of protecting cover 19 should have such a size that ring-shaped holding-down member 30 comes to be abutted against the upper rim 31 as is, indeed, shown in FIG. 2, then, expediently, an opening 32 is arranged for that purpose at holding-down member 30 to take care of the air connection from chamber 29 to tongue 20. In addition, holding-down member 30 serves the purpose of excluding that upper rim 31 comes in abutment against the wall of guard 23, since otherwise tongue 20 is prevented from moving upwardly as viewed in the drawing and a pressure balance from the interior space of the fluid reservoir toward chamber 29 is jeopardized.

The mode of functioning of the screw cap is as follows:

When overpressure or vacuum comes about in space 35 formed beneath the protecting cover 19, which space 35 is in connection with the adjacent float chamber of the fluid reservoir in the installed condition, then tongue 20 is either urged upward or pulled downward as viewed in the drawing. A pressure balance is established between space 35 and the atmosphere through chamber 29, passages 25 and opening 28. The overpressure or vacuum forming in space 35 is caused by the continuous change of the fluid level in the fluid reservoir which is due to the wear of the friction linings at the wheel brakes and to the displacment of fluid within the fluid reservoir.

When, for example during a motor wash of the automotive vehicle, cleansing liquid is splashed against the fluid reservoir by means of a pressure hose, it is true that a minor quantity of liquid will penetrate into chamber 29 through opening 28 and passage 25, but nevertheless the liquid level in the chamber 29 cannot rise to any appreciable extent beyond the highest point of outlet 33 of passages 25. Since the remaining range above protecting cover 19 is protected by guard 23, splash water cannot reach tongue 20 and, accordingly, the brake fluid beneath space 35 through protecting cover 19.

What is claimed is:

1. A screw cap, in particular for use in fluid reservoirs of hydraulic actuating systems, said screw cap having an opening and a pressure-balancing device sealingly surrounding the opening, said pressure-balancing device comprising a protective cover and a port which is configured in the protective cover, wherein said protective cover is surrounded by a guard having a passage, said passage being arranged below said port.

2. The screw cap of claim 1, wherein said protective cover has a cup-shaped cross-section, with said port being arranged at an upper rim of said protective cover and with the base of said protective cover formed by a ring-shaped rim which is sealingly received in a circular groove of the screw cap and which is bounded in radial direction by an annular collar of the screw cap, and wherein said guard features a substantially cup-shaped cross-section with a ring-shaped rim portion which rests on said rim of said protecting cover and which is bounded and retained by said annular collar in radial and in axial directions.

3. The screw cap of claim 2, wherein a bottom area of said ring shaped rim portion located opposite said rim is penetrated by slots extending radially from the inside toward the outside and an opening is provided in said annular collar at the level of said slots which penetrates said annular collar in a radial direction.

4. The screw cap of claim 2, wherein a radially inwardly projecting ring-shaped collar clamps said ring-shaped rim portion from behind in the mounting position.

5. The screw cap of claim 1, wherein said guard is made of plastic and said protecting cover made of rubber.

6. The screw cap of claim 1, wherein said port is formed by a tongue configured in one piece with said protecting cover, said tongue shutting off said port in the initial position and opening in the presence of overpressure or vacuum in the direction of the pressure gradient of the specific condition.

7. The screw cap of claim 1, wherein a holding-down member is configured in an upper edge at the inside wall of the said guard, said holding-down member being directed toward said upper rim of said protecting cover.

8. The screw cap of claim 7, wherein said holding-down member is formed by an annular collar and is penetrated by an opening in a radial direction.

9. The screw cap of claim 1, wherein an electric fluid level warning device is fastened in said screw cap beneath said protecting cover.

* * * * *